(12) United States Patent
Chafle et al.

(10) Patent No.: US 8,055,935 B2
(45) Date of Patent: *Nov. 8, 2011

(54) DYNAMIC ADAPTATION IN WEB SERVICE COMPOSITION AND EXECUTION

(75) Inventors: Girish Bhimrao Chafle, New Delhi (IN); Koustuv Dasgupta, New Delhi (IN); Arun Kumar, New Delhi (IN); Sumit Mittal, Uttar Pradesh (IN); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 1455 days.

This patent is subject to a terminal disclaimer.

(21) Appl. No.: 11/531,890

(22) Filed: Sep. 14, 2006

(65) Prior Publication Data

US 2008/0071597 A1   Mar. 20, 2008

(51) Int. Cl.
*G06F 11/00* (2006.01)
(52) U.S. Cl. .................... 714/4.21; 714/26
(58) Field of Classification Search .............. 714/4
See application file for complete search history.

(56) References Cited

U.S. PATENT DOCUMENTS

| | | | |
|---|---|---|---|
| 6,615,166 B1 * | 9/2003 | Guheen et al. | 703/27 |
| 6,985,939 B2 | 1/2006 | Fletcher et al. | |
| 7,003,560 B1 * | 2/2006 | Mullen et al. | 709/223 |
| 7,386,620 B2 * | 6/2008 | Lei et al. | 709/229 |
| 7,493,593 B2 * | 2/2009 | Koehler | 717/106 |
| 7,509,519 B2 * | 3/2009 | Srivastava et al. | 714/4 |
| 7,627,671 B1 * | 12/2009 | Palma et al. | 709/224 |
| 7,707,173 B2 * | 4/2010 | Nanavati et al. | 707/608 |
| 2002/0169889 A1 | 11/2002 | Yang et al. | |
| 2005/0065992 A1 | 3/2005 | Creamer et al. | |
| 2005/0086102 A1 | 4/2005 | Harrison et al. | |
| 2006/0036752 A1 * | 2/2006 | Lei et al. | 709/229 |
| 2007/0016573 A1 * | 1/2007 | Nanavati et al. | 707/5 |
| 2007/0168691 A1 * | 7/2007 | Srivastava et al. | 714/4 |

OTHER PUBLICATIONS

Z. Duan et al., "SOA without web services . . . ", Proceedings of 2005 IEEE International Conference on Services Computing, year 2005.
W-J. Van Den Heuvel et al., "Moving toward a framework to compose intelligent web services," Communications of the ACM, Oct. 2003.
S.M. Sadjadi et al., "Transparent shaping of existing software . . . ", DEAS 2005, May 21, 2005, St. Louis, MO.

(Continued)

*Primary Examiner* — Scott Baderman
*Assistant Examiner* — Kamini Patel
(74) *Attorney, Agent, or Firm* — Gibb I.P. Law Firm, LLC; Derek S. Jennings

(57) ABSTRACT

Dynamic adaptation is provided within web service composition and execution. Within a logical composition stage, a set of abstract workflows for a web service is selected from a number of generated abstract workflows. Within a physical composition stage, a set of executable workflows is selected from a number of executable workflows that are generated at least based on the set of abstract workflows selected. Within a runtime stage, an executable workflow to be executed is selected from the set of executable workflows and that particularly satisfies specified requirements. The executable workflow selected is executed within an execution environment. The executable workflow within the runtime stage, the set of executable workflows within the physical composition stage, and the set of abstract workflows within the logical composition stage are periodically dynamically assessed and reselected.

19 Claims, 6 Drawing Sheets

OTHER PUBLICATIONS

J. Sutherland et al, "Enterprise application integration and complex adaptive systems," Communications of the ACM, Oct. 2002.

S. Hwang et al., "GridWorkflow . . . ", Procs. of the 12th IEEE Int'l Symposium on High Performance Distributed Computing, 2003.

P.M. Berry et al., "Adaptive process management . . . ", Procs. of Workshop "Towards Adapative Workflow Systems," Conf. on Comp. Supported Cooperative Work, Seattle, WA, 1998.

G.A.C. Pautasso et al., "Autonomic execution of service compositions," Procs. of Int'l Conf. on Web Services, Florida, 2005.

A. Romanovsky et al., "On structure integrated web applications . . . ", Procs. of 6th Int'l Symp. on Autonomous Decentralised Systems, Pisa, Italy, 2003.

L. Zeng et al., "Quality driven web services composition," in Procs. of 12th WWW Conf., Budapest, Hungary, 2003.

* cited by examiner

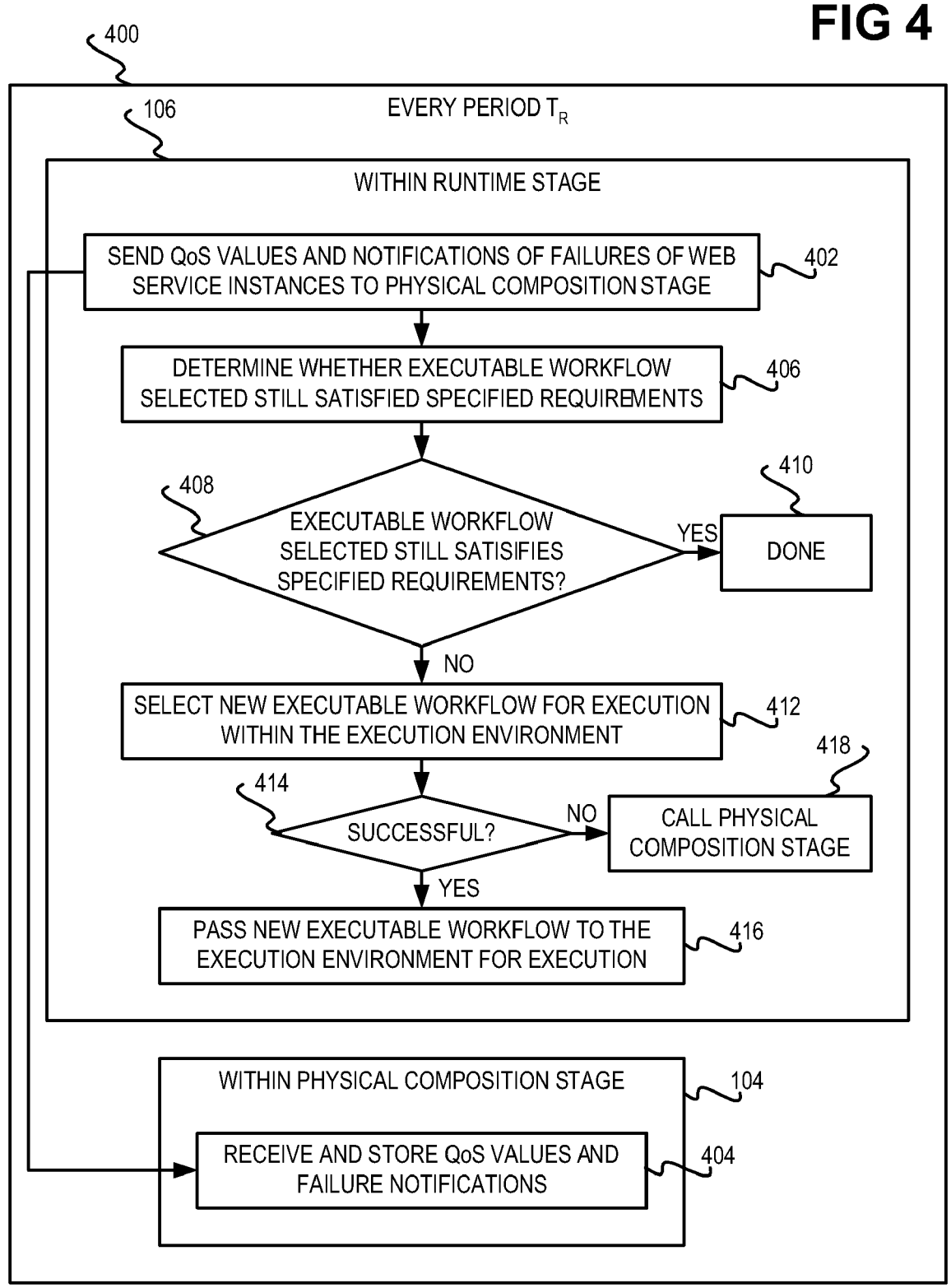

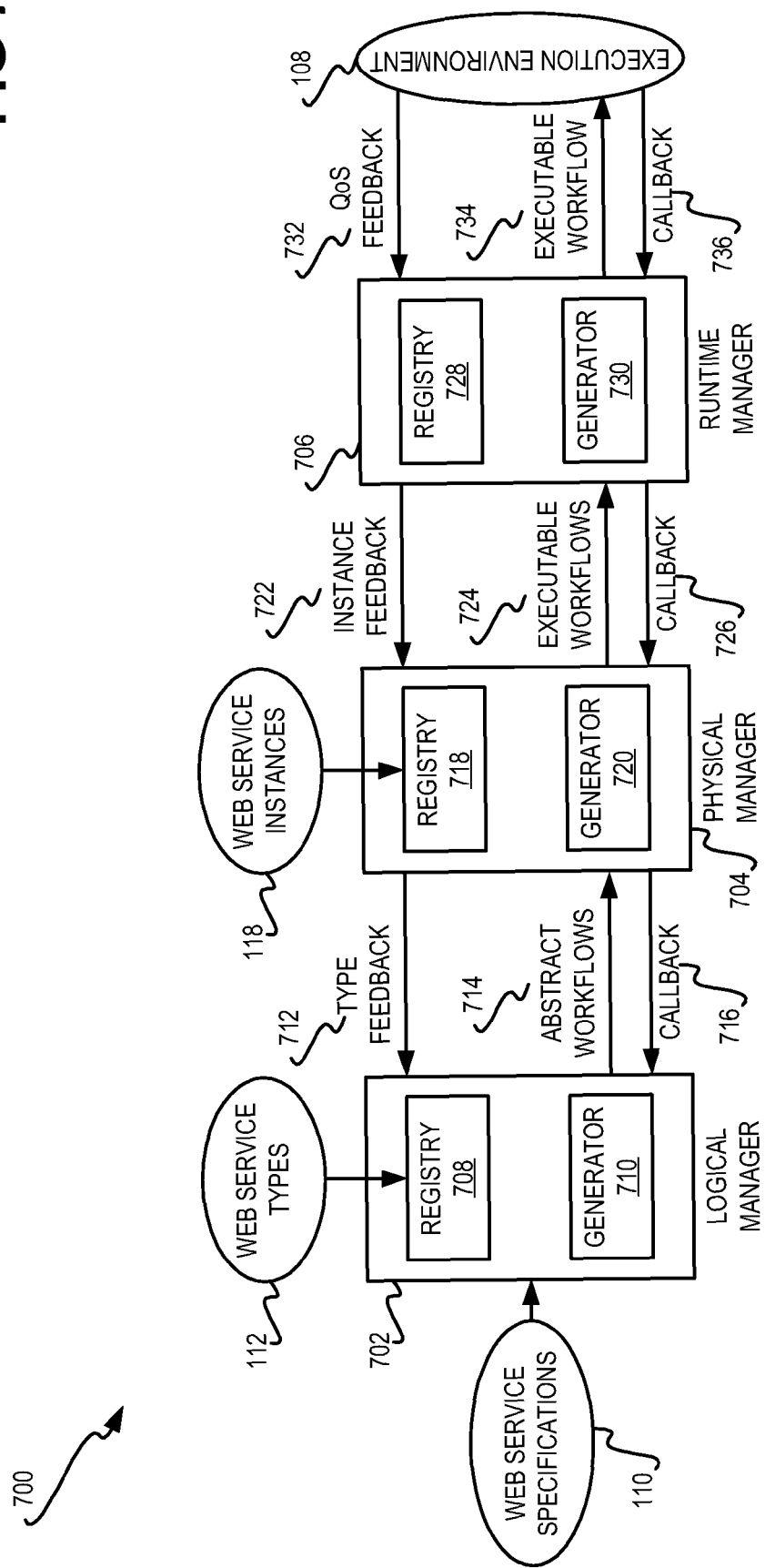

DYNAMIC ADAPTATION IN WEB SERVICE COMPOSITION AND EXECUTION

FIELD OF THE INVENTION

The present invention relates generally to composing and executing web services, and more particularly to dynamic adaptation of the composition and execution of web services in response to changes that occur during such web service composition and execution.

BACKGROUND OF THE INVENTION

The demand for quickly delivering new applications and adaptively managing them has become a business imperative. For example, given the intense competition within the telecommunications sector, mobile telephony service providers have to continually develop compelling applications to attract and retain end users, and quickly bring them to market. However, as the applications run, network configurations and quality-of-service (QoS) offerings and requirements may change, new service providers and business relationships may emerge, and existing ones may be modified or terminated. It is thus a challenge to design robust and responsive systems that address these changes effectively, while continually trying to optimize the operations of a given service provider.

Web services assist the transition of businesses towards being on-demand and responsive, by facilitating seamless business-to-business or enterprise application integration. Within the prior art, a principled web service composition approach has been proposed that drives the process from specification to deployment and execution of a composite workflow. This solution introduces a differentiation between web service types and instances, and uses efficient techniques to create the desired functionality, as well as select components that optimize the non-functional attributes.

However, existing approaches to provide end-to-end service composition environments lack the ability to adapt to changes. Nevertheless, such ability to adapt to change can be a critical requirement within dynamic business environments. A limited, albeit naive, approach is to adapt a solution by statically recomposing the solution from scratch every time a change occurs. However, this is not a feasible solution for multiple reasons. First, a significant amount of intervention from the developer is required. Second, there can be an inability to cope with the rate at which change occurs. Third, the complexity involved in exploring the composition search space can prohibit complete static recomposition.

Therefore, there is a need within the prior art for creating and executing Internet web services that adapts to changes within the operating environment at various stages of composition, deployment, and runtime. In the case of a failure or QoS or other changes, such a system should recover by replacing failed components with available alternatives. For these and other reasons, there is thus a need for the present invention.

SUMMARY OF THE INVENTION

The present invention relates to dynamic adaptation within web service composition and execution. A method of one embodiment of the invention, within a logical composition stage, selects a set of abstract (or first) workflows for a web service from a number of generated abstract (or first) workflows. Within a physical composition stage, a set of executable (or second) workflows is selected from a number of executable (or second) workflows that are generated at least based on the set of abstract (or first) workflows selected. Within a runtime stage, an executable (or third) workflow to be executed is selected from the set of executable (or second) workflows that particularly satisfies specified requirements. The executable (or physical, or third) workflow selected is executed within an execution environment, as a web service itself. The method periodically dynamically assesses and reselects the executable (or physical, or third) workflow within the runtime stage, the set of executable (or second) workflows within the physical composition stage, and the set of abstract (or first) workflows within the logical composition stage. Thus, it is ensured that the specified requirements are optimally (or best) satisfied by the executable (or third) workflow executed within the execution environment, even in the light of failures, and quality-of-service (QoS) and other types of changes.

In one embodiment, the runtime, physical composition, and logical composition stages are periodically reperformed to ensure that their respective selection of workflow(s) is still appropriate in light of failures and changes that have occurred. Such failures and changes are reported from the execution environment to the runtime stage, from the runtime stage to the physical composition stage, and from the physical composition stage to the logical composition stage, as appropriate, to ensure that all the stages are kept apprised of changes and failures that have occurred. Furthermore, in one embodiment in particular, when a failure occurs, callbacks occur from the execution environment to the runtime stage, from the runtime stage to the physical composition stage, and from the physical composition stage to the logical composition stage, as needed, in order to generate and/or select new workflow(s) that overcome the failure.

A system of an embodiment of the invention includes a logical manager, a physical manager, and a runtime manager. The logical manager generates a number of abstract workflows for a web service, based at least on a set of web service types, and selects a set of abstract workflows for the web service from the abstract workflows generated. The physical manager generates a number of executable workflows based at least on the set of abstract workflows and a set of web service instances, and selects a set of executable workflows from the executable workflows generated. The runtime manager selects an executable workflow to be executed, from the set of executable workflows, and that satisfies specified requirements. The executable workflow is executed within an execution environment.

Every period $T_M$, the execution environment at least returns QoS values regarding all available instances to the runtime manager, on which basis the runtime manager is capable of selecting a new executable workflow to be executed within the execution environment. Other functionality may also be performed every period $T_M$. Every period $T_R$, the runtime manager returns web service instance feedback to the physical manager, on which basis the physical manager is capable of generating new executable workflows. The physical manager then selects a new set of executable workflows from these new executable workflows to pass to the runtime manager for selection on the basis thereof of a new executable workflow to be executed within the execution environment. Other functionality may also be performed every period $T_R$.

Every period $T_P$, the physical manager returns web service type feedback to the logical manager on which basis the logical manager is capable of generating new abstract workflows. The logical manager then selects a new set of abstract workflows from these new abstract workflows to pass to the physical manager for generation of new executable workflows on the basis thereof. Other functionality may also be performed every period $T_P$. Every period $T_L$, the logical manager may generate new abstract workflows, select a new set of abstract workflows from these new abstract workflows, and pass the new set of abstract workflows to the physical manager, on which basis the physical manager generates new executable workflows and selects a new set of executable workflows therefrom.

An article of manufacture of an embodiment of the invention includes a tangible computer-readable medium, and means in the medium. The tangible computer-readable medium may be a recordable data storage medium, or another type of tangible computer-readable medium. The means is for performing the functionality of the various stages of the method that has been described, and/or is for performing the functionality of the various managers of the system that has been described. The means can also perform other functionality of other methods and/or of other components of other systems.

At least some embodiments of the invention provide for advantages over the prior art. In particular, web services are composed, or created, and executed in a way that adapts to changes within the operating environment at the various stages of composition, deployment, and runtime. Multiple workflows are employed to realize the same composition in terms of functional and non-functional requirements. In the case of a failure or QoS changes, the system can recover by replacing the failed components, or workflows, with available alternatives. A feedback mechanism is provided between successive changes, along with a ranking function at each stage, to guide the selection of the alternatives based on the operating conditions.

At least some embodiments of the invention provide a characterization of adaptive web service composition and execution. Such embodiments provide a staged solution that allows for adaptation by generating multiple workflows at different stages, and selectively deploying them based on feedback mechanism and suitable ranking functions. The embodiments of the invention can be incorporated within an end-to-end service creation environment, and is complementary to existing approaches for handling business- and system-related faults. Still other advantages, embodiments, and aspects of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2, 3, 4, 5, and 6 are flowcharts of methods for implementing the multiple-stage process flow of FIG. 1 for achieving dynamic adaptation of web service composition and execution, according to an embodiment of the invention.

FIG. 7 is a diagram of a system for implementing the multiple-stage process flow of FIG. 1 for achieving dynamic adaptation of web service composition and execution, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
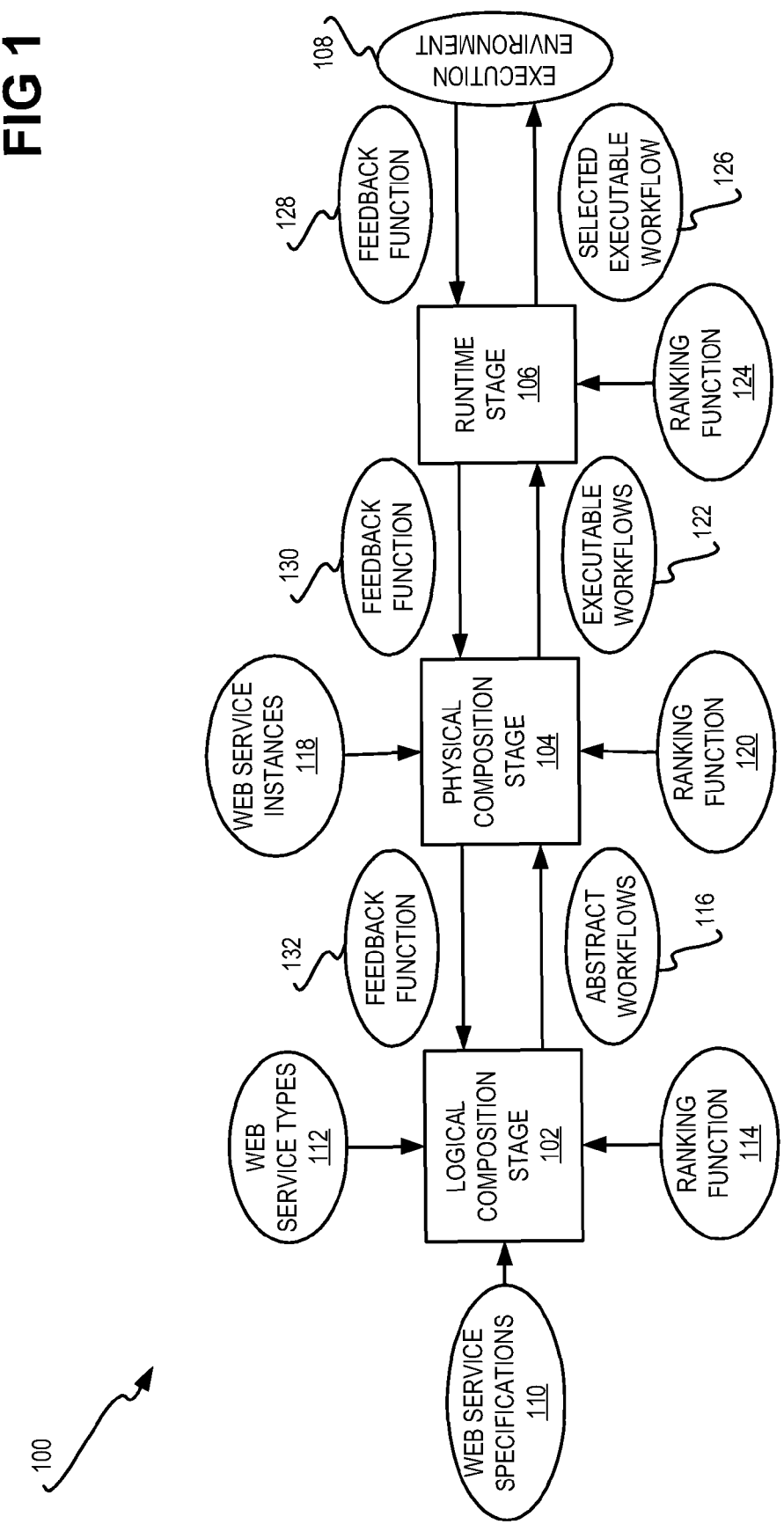
FIG. 1 is a diagram depicting a multiple-stage process flow that achieves dynamic adaptation of web service composition and execution, according to an embodiment of the invention.

FIG. 1 shows a multiple-stage process flow 100 for achieving dynamic adaptation of web service composition and execution, according to an embodiment of the invention. The process flow 100 includes three stages: a logical composition stage 102, a physical composition stage 104, and a runtime stage 106. Web service composition and execution is the process of realizing the requirements of a new web service using existing component services, and executing the resulting composite service on an execution infrastructure, which is depicted in FIG. 1 as the execution environment 108.

It is noted that the stages 102, 104, and 106 are substantially described herein as each being implemented within a single module or component, which can be software, hardware, or a combination of software or hardware. However, one or more of the stages 102, 104, and 106 can further each be implemented as a number of modules or components. In addition, two or more of the stages 102, 104, and 106 can be implemented together as or within a single module.

The web service specifications 110 are specified by an end user, and can be decomposed into two parts. The first part deals with the desired functionality of the composite service, which is referred to as the functional requirements. The second part involves specification of the non-functionality requirements that relate to issues such as performance and availability. The web service specifications 110 may be specified using an appropriate language, such as the web ontology language like OWL, as known within the art, for functionality requirements, and quality-of-service (QoS) specification for non-functional requirements. The OWL language is specifically described at the Internet web site http://www.w3.org/TR/owl-ref/.

The web service specifications 110 are input into the logical composition stage 102, as are web service types 112. It is noted that there is differentiation between the web service types 112 and their corresponding web service instances 118. The web service types 112 are groupings of similar (in terms of functionality) web services, whereas the web service instances 118 are those that are actually invoked to provide a desired component service. It can thus be said that each web service type may have one or more corresponding web service instances.

The web service types 112 can be denoted as $S=\{S_1, \ldots, S_\alpha\}$ for the set of $\alpha$ web service types. Likewise, the web service instances 118 can be denoted as $I=\{I_1, \ldots, I_\beta\}$ for the set of $\beta$ web service instances. Assuming that each web service type has M instantiations, $\beta=M\times\alpha$. Having a separate representation of type definitions from instance definitions assists in handling different requirements separately, allowing for efficient working with a large collection of services.

The problem solved by the process flow 100 of FIG. 1 is the adaptive web service composition and execution problem. This problem can be defined as: given the specifications 110 of a new web service, create and execute a workflow 126 that satisfies the functional and non-functional requirements of the web service, while being able to continually adapt to dynamic changes within the environment. A staged approach is thus followed where the functional composition, based on web service types, is decoupled from the non-functional composition, based on web service instances. The number of choices is increased by passing multiple feasible compositions across the stages 102, 104, and 106. For adaptation, the stages 102, 104, and 106 intelligently select among the available alternatives at each stage based on the current operating conditions.

The composition begins within the logical composition stage 102, in which abstract workflows, or templates, are generated based on the web service types 112 and the web service specifications 110, and a set of abstract workflows 116 selected therefrom by using a ranking function 114. This set of abstract workflows 116 is then passed to the physical composition stage 104, in which executable workflows are generated based on the web service instances 118 from the abstract workflows 116, and a set of executable workflows 122 selected therefrom by using a ranking function 120. Thus, within the logical composition stage 102, abstract workflows are generated based on service types 112, whereas within the physical composition stage 104, the selected set of abstract workflows 116 are concretized into executable workflows by selecting appropriate web service instances 118.

It is noted that a workflow is abstract if it does not associate service instances to the actions specified, and otherwise is executable. Furthermore, the terms plan, template, and abstract workflow are used interchangeably herein. The set of K abstract workflows selected within the logical composition stage 102, as the set of abstract workflows 116, can be denoted as $P=\{P_1, \ldots, P_K\}$. The set of L executable workflows selected within the physical composition stage 104, as the set of executable workflows 122, can be denoted as $W=\{W_1, \ldots, W_L\}$. It is noted that a composition approach that does not use the distinction between types and instances can nevertheless build an executable workflow set W, with each workflow of maximum length $\lambda$, by searching in the space $O(L \cdot \beta^\lambda)$. By comparison, the staged approach of the process flow 100 of FIG. 1 structures its solution search within a space of $O(K \cdot \alpha^\lambda) + O(L \cdot M^\lambda)$. Thus, scalability is provided to the overall composition process.

The set of executable workflows 122 selected within the physical composition stage 104 are passed to the runtime stage 106. The runtime stage 106 selects a single selected executable workflow 126 from this set of executable workflows 122 by using the ranking function 124. This selected executable workflow 126 is passed to the execution environment 108. The execution environment 108 then actually executes this selected executable workflow 126.

The ranking functions 114, 120, and 124 are thus employed to score various workflows, in order to select one or more of the workflows. In the case of the logical composition stage 102, the ranking function 114 scores the abstract workflows generated so that an appropriate (typically smaller) set of abstract workflows 116 can be selected and passed to the physical composition stage 104. The ranking function 114 may be denoted as $R_L$, which assigns a score to each abstract workflow $P_i$. The ranking function 114 can be defined using the length of the workflow, user comprehensibility of the workflow, as well as other factors. While generating P, the best K abstract workflows are thus selected in accordance with $R_L$.

In the case of the physical composition stage 104, the ranking function 120 scores the executable workflows generated so that an appropriate (typically smaller) set of executable workflows 122 can be selected and passed to the runtime stage 106. The ranking function 120 may be denoted as $R_P$, which assigns a score to each executable workflow $W_i$. The ranking function 120 can be defined using the QoS values of the instantiated workflows in W in one embodiment. The function $R_P$ can be used to select the best L executable workflows to be included in W.

In the case of the runtime stage 106, the ranking function 124 scores the executable workflows within the set of executable workflows 122 to select a single executable workflow to pass to the execution environment 108 for execution. The ranking function 124 may be denoted as $R_R$, which assists in picking the best executable workflow $W_{OPT}$. The executable workflow $W_{OPT}$ is the best executable workflow based on current QoS of the component service instances in W.

As has been noted, the process flow 100 provides for dynamic adaptation within web service composition and execution. This is achieved in part by various feedback functions 128, 130, and 132 between successive stages 102, 104, and 106 and of the execution environment 108. That is, while the executable workflow 126 is executing within the execution environment 108, different changes may occur. Some of these changes may affect the workflow 126 itself, through either component services failure or degradation of their QoS values. When the workflow 126 fails, other available executable workflows are explored within the runtime stage 106 to determine whether a suitable alternative exists to replace the faulty workflow 126.

Otherwise, however, the staged nature of composition is leveraged to initiate an incremental recovery process. Specifically, if the set of all available executable workflows 122 fail at the runtime stage 106, then a new set of such executable workflows W is generated by again invoking the physical composition stage 104. If at any time the physical composition stage 104 fails, then a new set of abstract workflows P is generated within the logical composition stage 102. As such, recovery in the face of failure or changes is incremental. That is, invocation of the stages 106, 104, and 102 is achieved only insofar as needed.

If the runtime stage 106 cannot locate another suitable executable workflow, then the physical composition stage 104 generates a new set of suitable executable workflows, and then the runtime stage 106 is again invoked. However, if the physical composition stage 104 cannot generate a new set of suitable executable workflows, then the logical composition stage 102 generates a new set of abstract workflows, and then the physical composition stage 104, followed by the runtime stage 106, are again invoked. Therefore, the recovery process is one in which just the runtime stage 106 is invoked; the runtime stage 106, followed by the physical composition stage 104, and again followed by the stage 106, are invoked; or, the runtime stage 106, followed by the physical composition stage 104 and the logical composition stage 102, and again followed by the stages 104 and 106 are invoked.

It is noted that new functionality in terms of new web service types being available can be communicated to the logical composition stage 102. Similarly, if new web service instances corresponding to an already existing web service type come up, the same can be incorporated at the physical composition stage 104. Transient variations of the QoS values of executing web services can be monitored and periodically aggregated at the runtime stage 106. Therefore, each of the stages 102, 104, and 106 can perform periodic health checks to evaluate the current set of alternatives, and change them if needed based on these changes within the environment. To aid this process, a feedback mechanism is provided as encompassing the various feedback functions 128, 130, and 132, as are now discussed in more detail.

The feedback function 128 can be denoted as $F_R$, and carries information about measured QoS values and failure of web service instances 118 from the execution environment 108 to the runtime stage 106. The function $F_R$ assists the runtime stage 106, and the ranking function 124, to select $W_{OPT}$ from W. The feedback function 130 can be denoted as $F_P$, and carries aggregated QoS information regarding the web service instances 118 over a period of time to the physical composition stage 104. This information assists the physical composition stage 104 in effectively ranking the workflows in W by invoking the ranking function 120. The feedback function 132 can be denoted as $F_L$, and carries information about the web service types 112 to the logical composition stage 102. If all the instances 118 of a particular web service type are found to be unavailable, this service type can be removed from consideration in generating additional abstract workflows, until new instances become available.

The web service composition within the composition stages 102 and 104 can be considered as a planning problem, where each particular web service or component corresponds to an action, and the initial and goal states are suitably defined to correspond to the requirements of the composite web service. In this context, an established framework of refinement search can be employed to assist in the adaptation process. The semantics of a plan P may be formalized in terms of its candidate set, denoted by <<P>>, which is the set of the sequence of instantiated actions that are compatible with the constraints of the plan.

First, controlling the search space of adaptation is described. The web service type corresponds to an action, and the web service instance corresponds to an executable, instantiated action. Within the logical composition stage 102, a set P of K abstract workflows is selected. Each abstract workflow $P_i$ has $|P_i|$ web service types in it, and its candidate set is <<$P_i$>>. The search space of physical composition is thus restricted to the candidate set of <<P>>=Σ <<$P_i$>>. Within the physical composition stage 104, each plan is instantiated into a set of executable workflows by replacing the web service types with web service instances, the output being <<W>>=(⊂<<P>>) candidates for execution. Within the runtime stage 106, just one of the executable workflows is selected for execution.

In the event of change, the runtime stage 106 just has to consider the L preselected candidates for adaptation. If it is not able to meet the end-to-end QoS from W, the runtime stage 106 informs the physical composition stage 104. The latter does not have to consider the full search space, and just focuses on <<P>>-<<W>> candidates for immediate adaptation. If the physical composition stage 104 is not able to generate at least one executable workflow that satisfies the end-to-end QoS from P, it informs the logical composition stage 102. The latter also does not have to consider the full search space, and can remove <<P>> from its immediate consideration.

Second, the generation and selection of multiple workflows is described. While passing multiple workflows between the stages 102 and 104, and between the stages 104 and 106, it is desirable to limit the number of workflows passed, and to minimize the number of times a subsequent stage refers to the previous stage for recovery from failure and adaptation to changing QoS. A problem similar to the generation of multiple plans is encountered within case-based reasoning and recommender systems, regarding how to select the alternatives and retrieve cases or recommendations to the user.

The established solution in the case-based reasoning and recommender problem domain is to choose a diverse set (i.e., dissimilar cases) from the case base, but to retrieve cases based on similarity. This translates to finding a set of workflows (P, W) that have maximum candidate sets. Where this is difficult, model similarity and dissimilarity can be employed using sample Hamming distances, as known within the art, which measure the number of different web service types or instances in the workflows.

In the remainder of the detailed description, a number of methods are described that explicate and expound on the basic process flow 100 that has been described in relation to FIG. 1. These methods can be considered one embodiment by which the basic process flow 100 can be practiced. Thereafter, a system is described that can implement both these methods, as well as the basic process flow 100.

Figure 2:
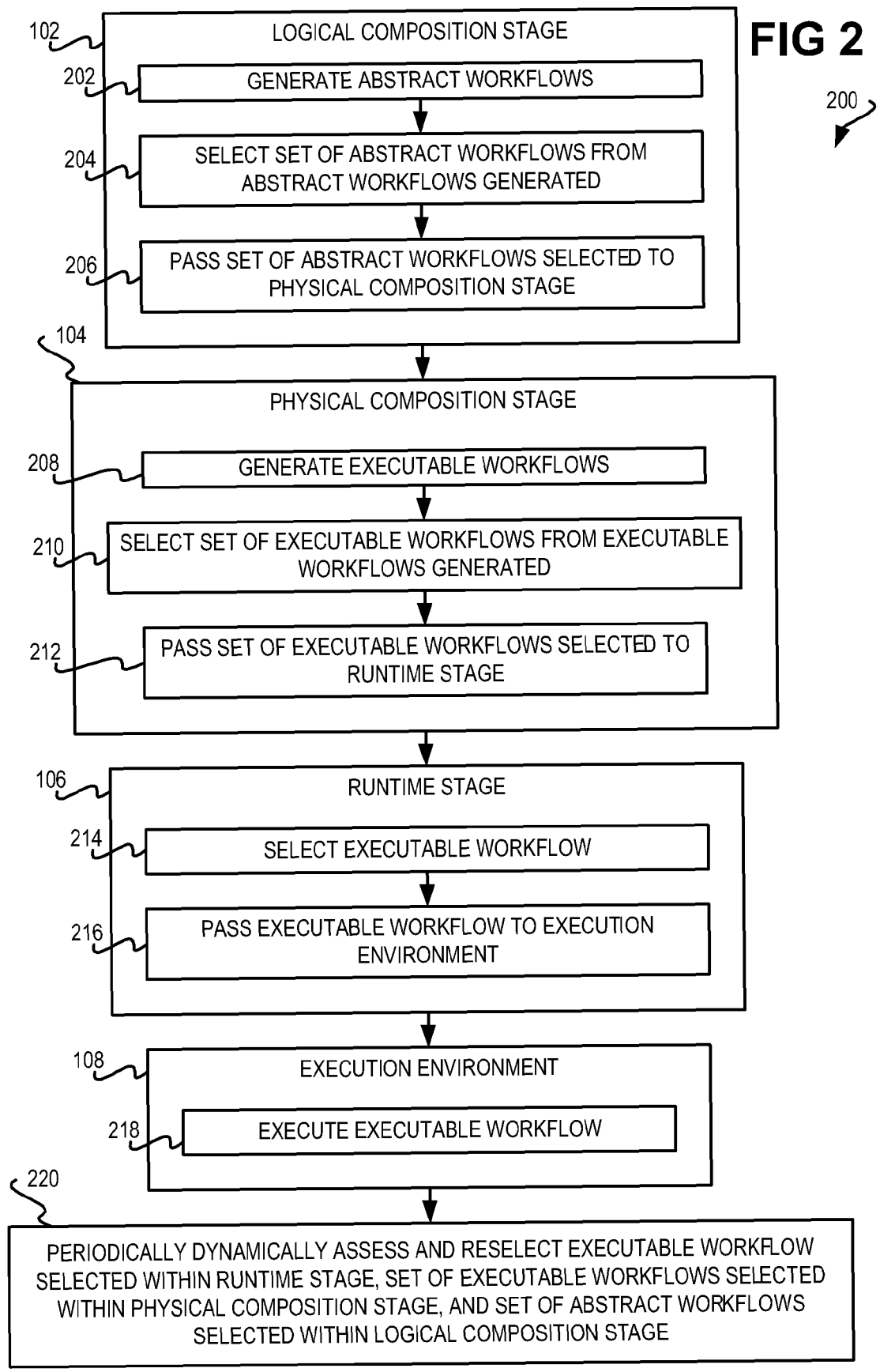

FIG. 2 shows a method 200 for the overall process of web service composition and execution, according to an embodiment of the invention. Various portions of the method 200 are depicted as being performed within the logical composition stage 102, within the physical composition stage 104, within the runtime stage 106, and within the execution environment 108. Within the logical composition stage 102, a number of abstract workflows are generated (202). For instance, as has been described, the abstract workflows are generated based on the web service types 112 available, in accordance with the web service specifications 110.

Thereafter, a set of abstract workflows is selected from the abstract workflows that have been generated (204). For instance, as has been described, the set of abstract workflows 116 may be selected from these generated abstract workflows by employing the ranking function 114. The set of abstract workflows selected are passed from the logical composition stage 102 to the physical composition stage 104 (206).

Within the physical composition stage 104, a number of executable workflows are generated (208). For instance, as has been described, the executable workflows are generated based on the web service instances 118 for the web service types 112, as well as on the set of abstract workflows 116 received from the logical composition stage 102. Thereafter, a set of executable workflows is selected from the executable workflows that have been generated (210). For instance, as has been described, the set of executable workflows 122 may be selected from these generated executable workflows by employing the ranking function 120. The set of executable workflows selected are passed from the physical composition stage 104 to the runtime stage 106 (212).

Within the runtime stage 106, a single executable workflow is selected for execution (214). For instance, as has been described, this executable workflow can be selected from the set of executable workflows received from the physical composition stage 104 by employing the ranking function 124. For instance, this executable workflow may be selected as that which best, or optimally, satisfies specified requirements, such as particular QoS requirements. The single executable workflow selected is then passed to the execution environment 108 (216), within which this executable workflow is executed (218).

Periodically, the method 200 dynamically assesses and reselects one or more of the following (220). First, the executable workflow selected within the runtime stage 106 as executed within the execution environment 108 may be periodically dynamically assessed and reselected. Second, the set of executable workflows selected within the physical composition stage 104 from which the single executable workflow is selected within the runtime stage 106 may be periodically dynamically assessed and reselected. Third, the set of abstract workflows selected within the logical composition stage 102 from which the executable workflows are generated within the physical composition stage 104 may be periodically dynamically assessed and reselected.

Figure 3:
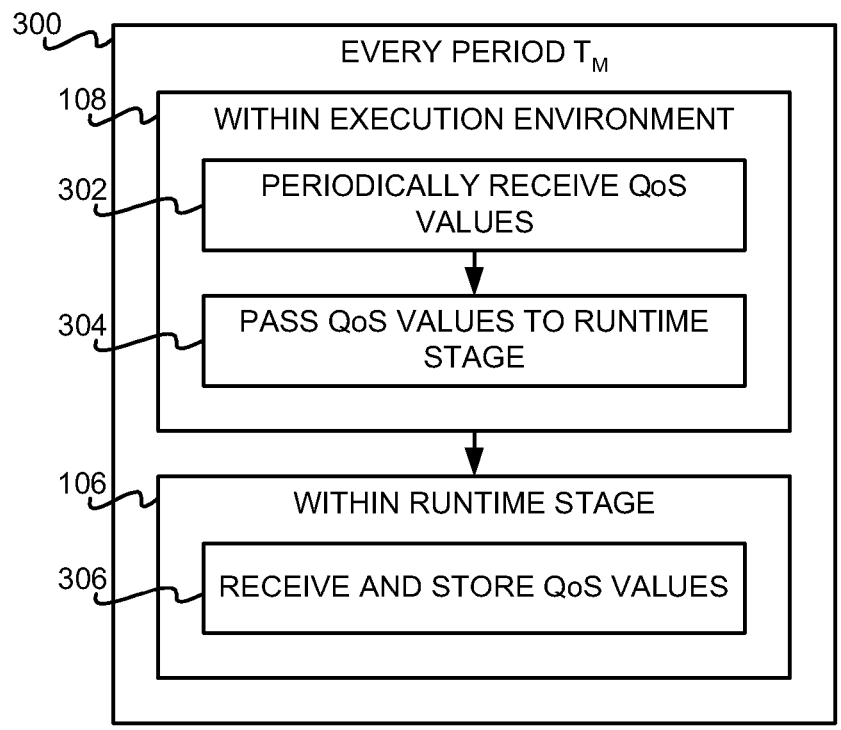
Figure 6:
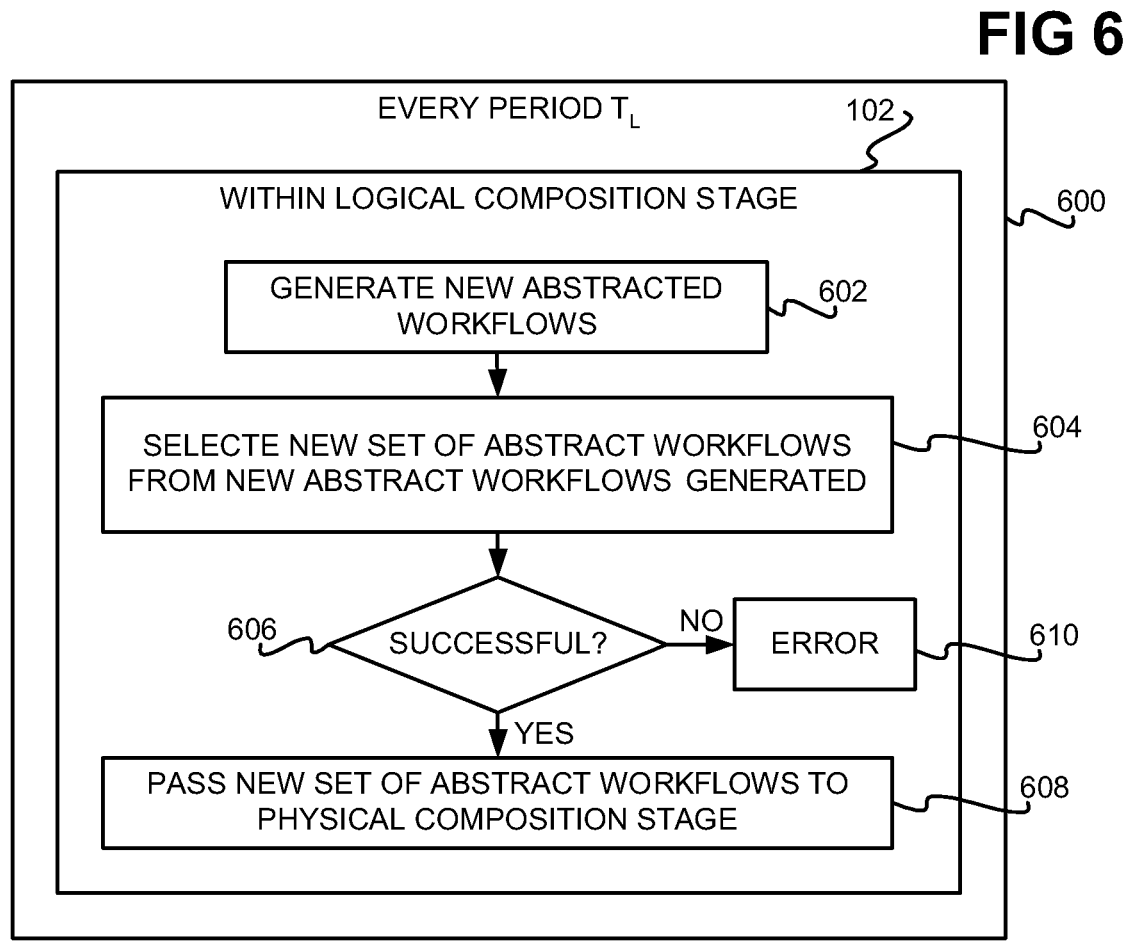
Figure 5:
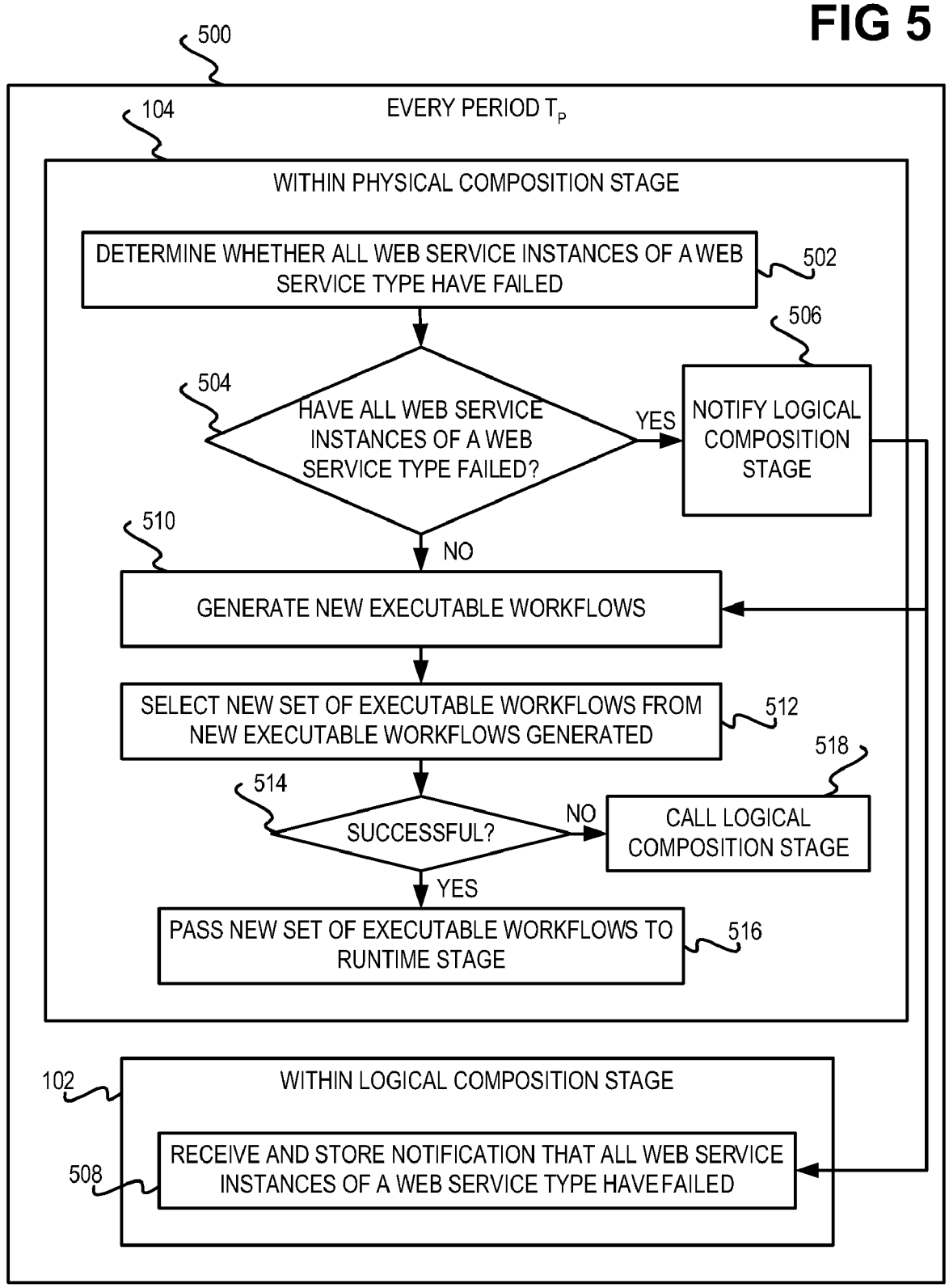

The dynamic assessment and reselection within part 220 of the method 200 may be performed in one embodiment by performing the method 300 of FIG. 3, the method 400 of FIG. 4, the method 500 of FIG. 5, and/or the method 600 of FIG. 6, in one embodiment of the invention. Referring first to FIG. 3, the method 300 is performed every period of time $T_M$. Within the execution environment 108, QoS values regarding the executable workflow currently being executed are monitored and received (302), and then passed to the runtime stage 106 (304). The QoS values may be with respect to specific web service instances of this workflow. Thus, within the runtime stage 106, these QoS values are received and stored (306). The reporting of QoS values in parts 304 and 306 may be considered calling of the feedback function 128 of FIG. 1 that has been described.

Referring next to FIG. 4, the method 400 is performed every period of time $T_R$, which in one embodiment may be greater than the period $T_M$. Within the runtime stage 106, the QoS values regarding the specific web service instance of the executable workflow currently being executed, as well as notifications of any failures of such web service instances, are sent to the physical composition stage 104 (402). Within the physical composition stage 104, these QoS values and failure notifications are received and stored (404). The reporting of these QoS values and failure notifications in parts 402 and 404 may be considered calling of the feedback function 130 of FIG. 1 that has been described.

Thereafter, within the runtime stage 106, it is determined whether the executable workflow previously selected still satisfies the specified requirements (406), such as particular QoS requirements, based on the QoS values regarding this workflow that were previously received from the execution environment 108. If so (408), then the runtime stage 106 does not perform any further action (410). That is, the executable workflow currently being executed has been periodically and dynamically assessed as still satisfying the specified requirements, and thus is allowed to continue execution within the execution environment 108. This assessment is periodic in the sense that it is periodically performed every period $T_R$, and is dynamic in the sense that it is performed while the executable workflow in question is running.

However, if the executable workflow previously selected no longer satisfies the specified requirements (408), then a new executable workflow is selected for execution within the execution environment 108 (412). This new executable workflow is attempted to be selected from the set of executable workflows most recently received from the physical composition stage 104, and that satisfies the specified requirements based on current operating conditions, as may be at least partially presented via the feedback function 128. In one embodiment, the new executable workflow may be the optimal workflow that satisfies the specified requirements. However, in another embodiment, the new workflow may not necessarily be the optimal workflow that satisfies these requirements. Furthermore, the new executable workflow can in fact be the previously selected workflow, such that this latter workflow is reselected as the new workflow. Performance of part 412 is comparable to performance of part 214 of the method 200 of FIG. 2 that has been described. If such selection of a new executable workflow is successful (414), in that an executable workflow is found that satisfies the specified requirements, then it is passed to the execution environment 108 for execution (416), in lieu of the previously selected executable workflow. Thus, flow can be considered to proceed from part 416 of the method 400 back to part 218 of the method 200 of FIG. 2.

However, if the runtime stage 106 was unable to find a new executable workflow from the set of executable workflows most recently received from the physical composition stage 104 that satisfies the specified requirements under the current operating conditions (414), then the runtime stage 106 calls the physical composition stage 104 (418). The physical composition stage 104 is called in order for it to generate new executable workflows, select a new set of executable workflows therefrom, and then to pass this new set of executable workflows to the runtime stage 106, so that the runtime stage 106 can select a single new executable workflow for execution within the execution environment 108. Thus, flow can be considered to proceed from part 418 of the method 400 back to part 208 of the method 200 of FIG. 2, or more accurately to part 510 of the method 500 of FIG. 5, as will be described.

It is noted that the callback process of parts 406, 408, 410, 412, 414, 416, and 418 of the method 400 is such that callback to another stage is incremental and is performed only when needed. That is, the runtime stage 106 first attempts to locate another executable workflow that satisfies the specified conditions given the current operating conditions. Only when it does not locate another executable workflow does it call the physical composition stage 104 to generate new executable workflows and select a new set of such executable workflows, from which the runtime stage 106 can then again attempt to locate another executable workflow that satisfies the specified conditions given the current operating conditions.

Referring next to FIG. 5, the method 500 is performed every period of time $T_P$, which in one embodiment may be greater than the period $T_R$. Within the physical composition stage 104, it is determined whether all the web service instances of a given web service type have failed (502). If so, then the logical composition stage 102 is thusly notified (506), and such notification is received and stored within the logical composition stage 102 (508). The reporting of this information in parts 506 and 508 may be considered calling of the feedback function 132 of FIG. 1 that has been described.

Thereafter, within the physical composition stage 104, new executable workflows are generated (510), either after notifying the logical composition stage 102 in part 506 where all instances of any type have failed, or directly from part 504 where not all instances of any type have failed. These new executable workflows are generated from the most recently received set of abstract workflows from the logical composition stage 102, and performance of part 510 is comparable to part 208 of the method 200 of FIG. 2 that has been described. A new set of executable workflows is selected from these new executable workflows generated (512), and performance of part 512 is comparable to performance of part 210 of the method 200 that has been described.

The new executable workflows are attempted to be generated in part 510, and the new set of executable workflows is attempted to be selected in part 512 from these newly generated executable workflows, based on the current operating conditions, as may be at least partially presented via the feedback function 130. Either part 510 or part 512 may fail. For instance, the current operating conditions may be such that new executable workflows cannot be generated from the most recently received set of abstract workflows from the logical composition stage 102. Alternatively, the current operating conditions may be such that an appropriate new set of executable workflows cannot be selected from newly generated executable workflows.

Therefore, in the case where generation of new executable workflows and selection of a new set of executable workflows from these newly generated executable workflows is successful (514), the new set of executable workflows is passed to the runtime stage 106 (516). The runtime stage 106 uses this new set of executable workflows from which to select a single new executable workflow to be executed within the execution environment 108. Thus, flow can be considered to proceed from part 516 of the method 500 back to part 214 of the method 200 of FIG. 2, or to part 412 of the method 400 of FIG. 4.

However, in the case where generation of new executable workflows or selection of a new set of executable workflows from these newly generated executable workflows is unsuccessful (514), the logical composition stage 102 is called (518). The logical composition stage 102 is called in order for it to generate new abstract workflows, select a new set of abstract workflows therefrom, and then to pass this new set of abstract workflows to the physical composition stage 104, so that the physical composition stage 104 can successfully generate new executable workflows and successfully select a new set of executable workflows. That is, once a new set of abstract workflows is received from the logical composition stage 102, the physical composition stage 104 again tries to generate new executable workflows, this time from this new set of abstract workflows, and to select a new set of executable workflows. Therefore, flow can be considered to proceed from part 518 of the method 500 back to part 202 of the method 200 of FIG. 2, or more accurately to part 602 of the method 600 of FIG. 6, as will be described.

It is noted that the callback process of parts 510, 512, 514, 516, and 518 of the method 500 are thus complementary to the callback process of parts 406, 408, 410, 412, 414, 416, and 418 of the method 400 of FIG. 4 that has been described. Both of these callback processes are such that callback to another stage is incremental and is performed only when needed. Thus, in the callback process of FIG. 4, the runtime stage 106 first attempts to locate another executable workflow that satisfies the specified conditions given the current operating conditions. Only when it fails does the runtime stage 106 call the physical composition stage 104. Likewise, in the callback process of FIG. 5, the physical composition stage 104 first attempts to generate new executable workflows and to select a new set of executable workflows therefrom, given the current operating conditions. Only when it fails does the physical composition stage 104 call the logical composition stage 102 to generate new abstract workflows and select a new set of such abstract workflows, from which the physical composition stage 104 can then again attempt to generate new executable workflows, and so on.

Referring finally to FIG. 6, the method 600 is performed every period $T_L$, which in one embodiment may be greater than the period $T_P$. Within the logical composition stage 102, new abstract workflows are generated (602). These new abstract workflows are generated from the given web service specifications 110 and the web service types 112, in accordance with the current operating conditions as may be at least partially presented via the feedback function 132. Thus, performance of part 602 is comparable to part 202 of the method 200 of FIG. 2 that has been described. Likewise, a new set of abstract workflows is selected from these new abstract workflows generated (604), in accordance with the current operating conditions as may be at least partially presented via the feedback function 132, where performance of part 604 is comparable to part 204 of the method 200 that has been described.

The new abstract workflows are attempted to be generated in part 602, and the new set of abstract workflows is attempted to be selected in part 604 from these newly generated abstract workflows, based on the current operating conditions. Either part 602 or part 604 may fail. For instance, the current operating conditions may be such that new abstract workflows cannot be generated. Alternatively, the current operating conditions may be such that an appropriate new set of abstract workflows cannot be selected from newly generated abstract workflows.

Therefore, in the case where generation of new abstract workflows and selection of a new set of abstract workflows from these newly generated abstract workflows is successful (606), the new set of abstract workflows is passed to the physical composition stage 104 (608). The physical composition stage 104 uses this new set of abstract workflows from which to generate new executable workflows. Thus, flow can be considered to proceed from part 608 of the method 600 back to part 208 of the method 200 of FIG. 2, or to part 510 of the method 500 of FIG. 5.

However, in the case where generation of new abstract workflows or selection of a new set of execution workflows from these newly generated abstract workflows is unsuccessful (606), an error occurs (610). Because the logical composition stage 102 is the first and initial stage of the composition process, there is no earlier stage to callback. A user may be informed that end-to-end composition and execution of the web service in question has failed, so that subsequent human analysis may be performed to determine the cause of the error and how best it can be rectified.

FIG. 7 shows a system 700, according to an embodiment of the invention. The system 700 includes a logical manager 702, a physical manager 704, and a runtime manager 706. The managers 702, 704, and 706 may be implemented in software, hardware, or a combination of software and hardware. The managers 702, 704, and 706 generally perform the functionality of the logical composition stage 102, the physical composition stage 104, and the runtime stage 106, respectively, as has been described.

The logical manager 702 and the physical manager 704 are configured with details of available web service types 112 and web service instances 118, respectively. The logical manager 702 maintains a registry 708 that receives information about failures of all the service instances of a given service type, via the type feedback 712, from the physical manager 704. The physical manager 704 maintains a registry 718 that receives information about failures of service instances and about QoS values regarding the service instances, via the instance feedback 722, from the runtime manager 706. The runtime manager 706 maintains a registry 728 that receives information about QoS changes and/or failures of service instances, via the QoS feedback 732, from the execution environment 108.

During the composition process, the logical manager 702 invokes a generator 710. The generator 710 is a component to generate abstract workflows that meet the functional requirements of the desired web service, as provided by the user via the web service specifications 110. A set of these abstract workflows is selected and passed to the physical manager 704, as indicated by the arrow 714, which stores the set of abstract workflows.

The physical manager 704 invokes a generator 720, which is a component to generate executable workflows by selecting an appropriate web service instance for each service type of an abstract workflow. The generator 720 furthermore selects a set of these executable workflows, and passes them to the runtime manager 706, as indicated by the arrow 724. The selection process is based on optimization of the non-functional requirements of the composite service.

The runtime manager 706 stores the set of executable workflows received from the physical manager 704. The runtime manager 706 invokes a selector 730, which is a component that selects the best executable workflow, in terms of overall composite QoS. This selected executable workflow is passed to the execution environment 108, as indicated by the arrow 734. The execution environment 108 then executes the selected executable workflow received.

To make the system 700 sensitive to changes within the environment, such as changes in the operating conditions, there is a feedback channel associated with each of the managers 702, 704, and 706. The execution environment 108 provides periodic feedback about monitor QoS values of instances to the runtime manager 706, via the QoS feedback channel 732. The QoS changes are aggregated by web service instance and sent periodically by the runtime manager 706 to the physical manager 704, via the instance feedback channel 722. Furthermore, if the instances of a particular service type are all unavailable for a particular period, this information is passed from the physical manager 704 to the logical manager 702, via the type feedback channel 712.

This latter information ensures that the web service type in question is not used by the generator 710 in generating subsequent abstract workflows. Whenever one or more of the failed web service instances recover, the information is fed back from the execution environment 108, to the runtime manager 706, to the physical manager 704, and back to the logical manager 702, which again can use them when generating abstract workflows. Finally, information about the availability of new service types and instances is input into the registries 708 and 718, respectively.

A callback mode is provided within the system 700 as well, for situations where all available workflows at a given stage have failed, as has been described in relation to the methods of FIGS. 2-6. Thus, this mode is used by the execution environment 108 to report failure of the executable workflow currently being executed to the runtime manager 706, as indicated by the arrow 736. This mode is further used by the runtime manager 706 to invoke the physical manager 704 if no other available workflows can be executed, due to failures of instances and/or QoS violations, as indicated by the arrow 726. The callback mode is also used by the physical manager 704 to request that the logical manager 702 generate new abstract workflows, as indicated by the arrow 716, where none of the available abstract workflows can be concretized into executable workflows.

The detailed description is concluded with a description of the generation of various multiple workflows, within the process flow 100 of FIG. 1, the methods of FIGS. 2-6, and the system 700 of FIG. 7. First, the generation of multiple abstract workflows is described. Such multiple abstracted templates within the logical composition stage 102 can be generated manually, or by using planning techniques that work on semantically annotated web services. For instance, prototype architectures have been developed that provide for end-to-end composition, such that contingent planning methodology can be used to automate the task of generating abstract workflows for a given service specification.

In order to generate K abstract workflows, a decision has to be made about which K abstract workflows should ultimately be selected. In the absence of any other information, the first K abstract workflows can be selected. Alternatively, all possible abstract workflows can be generated, and a user allowed to select K among them based on his or her expertise or requirements. A third option is to randomly select an abstract workflow and then recursively select subsequent abstract workflows that are maximally distant from the already included ones, using a Hamming distance.

Next, the generation of multiple executable workflows is described. The problem of generating such multiple executable workflows can be divided into two parts. The first part deals with the creation of multiple executable workflows from a single abstract workflow. The second part is concerned with the formation of W by selectively picking workflows corresponding to different abstract workflows.

An optimization framework may be employed to generate an executable workflow for an abstract workflow by selecting an instance for each type within the abstract workflow. The idea is to optimize QoS while meeting the constraints specified for the composite service. Specifically, a normalized function Q, where $0<Q<1$, is optimized, that captures the end-to-end values of a number of QoS dimensions, such as cost, response time, and availability, according to some relative weights. The framework can in one embodiment be built on known QoS models and mathematical formulations.

Such an optimization framework may be suited for generating just one workflow for a given abstract workflow. Therefore, one solution is to intelligently remove a few instances from consideration, while repeatedly invoking the optimization framework, until, at most, L executable workflows are generated. Two strategies may be followed in this respect.

First, a strategy referred to as 0-reuse may be employed. This strategy does not allow any duplication of instances among the multiple executable workflows generated. Therefore, two executable workflows selected with this strategy will have a Hamming distance of $\lambda$ between them, where $\lambda$ is the length of the entire end-to-end web service workflow in question. For implementation, the services selected at each invocation of the framework are removed from further consideration, such that the next invocation binds a new set of services to the abstract workflow.

Second, a strategy referred to as k-reused may be employed. This strategy allows at most $\lambda$-k duplication of instances among executable workflows. In other words, two executable workflows selected with this strategy have a Hamming distance of at least k between them. For this strategy, k services may be randomly selected, and these services prevent from being used in subsequent executable workflows. As can be appreciated by those of ordinary skill within the art, other strategies and frameworks may also be employed seamlessly within the adaptive composition and execution process that has been described herein.

The second part of the generation of multiple executable workflows, as has been noted above, is concerned with the formation of W by selectively picking workflows corresponding to different abstract workflows. Thus, having generated multiple executable workflows for each abstract workflow, the task is reduced to selecting L executable workflows therefrom. The motivation is to maximize the total sum of the QoS values of the selected executable workflows, while ensuring that each abstract workflow receives a minimum representation in the selected set of executable workflows. Providing minimum representation for each abstract workflow can assist in providing more flexibility for selection of a given executable workflow to execute at the runtime stage 106.

In one embodiment, the task of such selection is considered an Integer Programming (IP) optimization problem, which can be solved by existing methods. For instance, let $Q_{ji}$ denote the QoS of the executable workflow i for an abstract workflow j. $y_{ji}$ is an integer variable, such that $y_{ji}$ is 1 if the executable workflow i is selected for abstract workflow j, and 0 otherwise. The objection function is then:

$$\text{Maximize} \sum_{j=1}^{K} \sum_{i=1}^{L} y_{ji} * Q_{ji} \qquad (1)$$

There are two associated constraints. First, the total number of executable workflows selected is to be less than or equal to L, such that this constraint can be expressed as:

$$\sum_{j=1}^{K} \sum_{i=1}^{L} y_{ji} \leq L \qquad (2)$$

Second, there should be a minimum representation for each of the abstract workflows passed from the logical composition stage 102 to the physical composition stage 104. If k denotes the minimum representation for each abstract workflow, then this constraint can be expressed as:

$$\sum_{i=1}^{L} y_{ji} \geq \kappa, \forall_{j=1,\ldots,\kappa} \qquad (3)$$

The output is thus a set of L executable workflows, any one of which can be deployed within the runtime stage 106 within the execution environment 108. This redundancy allows the runtime stage 106 to handle failures, if and when they occur, by switching to an alternative workflow dynamically. By storing predetermined workflows throughout the stages 102, 104, and 106, the system can react to changes quickly at each of these stages. Such intervention may be automatic, or it may be manually instigated by a user, as can be appreciated by those of ordinary skill within the art.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
    within a logical composition stage, selecting a set of first workflows for a web service from a plurality of first workflows generated for the web service, wherein the selecting the set of first workflows includes one of: selecting a first K, first workflows from the plurality of first workflows, and randomly selecting a first workflow then recursively selecting subsequent first workflows that are maximally distant from previously selected first workflows using a Hamming distance;
    within a physical composition stage, selecting a set of second workflows from a plurality of second workflows generated based at least on the set of first workflows selected within the logical composition stage;
    within the runtime stage, selecting a third workflow to be executed from the set of second workflows that satisfies specified requirements;
    within an execution environment, executing the third workflow selected, as execution of the web service; and,
    periodically dynamically assessing and reselecting the third workflow selected within the runtime stage, the set of second workflows selected within the physical composition stage, and the set of first workflows selected within the logical composition stage.

2. The method of claim 1, wherein, within the runtime stage, selecting the third workflow to be executed from the set of second workflows comprises selecting the third workflow that best satisfies the specified requirements.

3. The method of claim1, wherein periodically dynamically assessing and reselecting comprises:
    within the execution environment,
        monitoring quality-of-service values regarding available web service instances within the execution environment;
        periodically passing the quality-of-service values received to the runtime stage for updating a quality-of-service database maintained within the runtime stage.

4. The method of claim 3, wherein periodically dynamically assessing and reselecting further comprises:
    within the execution environment,
        where a web service instance of the executable workflow being executed within the execution environment fails and causes the executable workflow being executed to fail,
            calling the runtime stage to select a new third workflow for execution within the execution environment.

5. The method of claim 4, wherein the runtime stage is to select the new third workflow as that which satisfies the specified requirements, the new third workflow being one of:
    a workflow that best satisfies the specified requirements; and,
    a workflow that does not necessarily best satisfy the specified requirements.

6. The method of claim 4, wherein periodically dynamically assessing and reselecting further comprises, where the web service instance of the executable workflow being executed within the execution environment fails and causes the executable workflow being executed to fail:
    within the runtime stage,
        selecting a new third workflow from the set of second workflows that satisfies the specified requirements, for execution within the execution environment;
        where the new third workflow that satisfies the specified requirements has been successfully selected,
            passing the new third workflow to the execution environment for execution therein; and,
        otherwise,
            calling the physical composition stage to select a new set of second workflows from which a new third workflow can be selected within the runtime stage for execution within the execution environment.

7. The method of claim 6, wherein periodically dynamically assessing and reselecting further comprises, where the web service instance of the third workflow being executed within the execution environment fails and causes the third workflow being executed to fail, and where a new third workflow that satisfies the specified requirements has not been successfully selected:
    within the physical composition stage,
        generating a new plurality of second workflows based at least on the set of first workflows selected within the logical composition stage;

selecting a new set of second workflows from the new plurality of second workflows generated;

where the new plurality of second workflows have been successfully generated and the new set of second workflows have been successfully selected, passing the new set of second workflows to the runtime stage within which a new third workflow to be executed within the execution environment is selected from the new set of second workflows; and, otherwise, calling the logical composition stage to select a new set of first workflows from which a new plurality of second workflows can be generated and so that the new set of second workflows can be selected from the new plurality of second workflows generated.

8. The method of claim 7, wherein periodically dynamically assessing and reselecting further comprises, where the web service instance of the third workflow being executed within the execution environment fails and causes the third workflow being executed to fail, where a new third workflow that satisfies the specified requirements has not been successfully selected, and where a new plurality of second workflows have not been successfully generated and/or a new set of second workflows have not been successfully selected, within the logical composition stage, generating a new plurality of first workflows for the web service;

selecting a new set of first workflows for the web service based on the new plurality of first workflows generated;

where the new plurality of first workflows have been successfully generated and the new set of first workflows have been successfully selected, passing the new set of first workflows to the physical composition stage within which a new plurality of second workflows is generated based on the new set of first workflows and within which a new set of second workflows is selected from the new plurality of second workflows.

9. The method of claim 1, wherein periodically dynamically assessing and reselecting comprises:

within the runtime stage, receiving quality-of-service values regarding the third workflow being executed from the execution environment; and, periodically sending the quality-of-service values and notifications of failures of web service instances of the third workflow being executed to the physical composition stage.

10. The method of claim 1, wherein periodically dynamically assessing and reselecting comprises:

within the physical composition stage, receiving quality-of-service values and notifications of failures of web service instances of the third workflow being executed from the runtime stage;

periodically determining whether all of the web service instances of a web service type have failed; and, where all the web service instances of a web service type have failed, sending a notification to the logical composition stage that all the web service instances of the web service type have failed.

11. The method of claim 10, wherein periodically dynamically assessing and reselecting further comprises:

within the physical composition stage, generating a new plurality of second workflows based at least on the quality-of-service values, the notifications of failures of web service instances, and the set of first workflows selected within the logical composition stage;

selecting a new set of second workflows from the new plurality of second workflows generated;

where the new plurality of second workflows have been successfully generated and the new set of second workflows have been successfully selected, passing the new set of second workflows to the runtime stage within which a new third workflow to be executed within the execution environment is selected from the new set of second workflows; and, otherwise, calling the logical composition stage to select a new set of first workflows from which a new plurality of second workflows can be generated and so that the new set of second workflows can be selected from the new plurality of second workflows generated.

12. The method of claim 1, wherein periodically dynamically assessing and reselecting comprises:

within the logical composition stage, receiving from the physical composition stage a notification that all web service instances of a web service type have failed.

13. The method of claim 12, wherein within the runtime stage, selecting the third workflow to be executed from the set of second workflows comprises selecting the third workflow that satisfies the specified requirements but that does not necessarily best satisfy the specified requirements.

14. The method of claim 12, wherein within the runtime stage, selecting the third workflow to be executed from the set of second workflows comprises reselecting the third workflow that was previously selected.

15. The method of claim 12, wherein periodically dynamically assessing and reselecting further comprises:

within the logical composition stage, generating a new plurality of first workflows for the web service, based at least on the notification that all the web service instances of the web service type have failed;

selecting a new set of first workflows for the web service based on the new plurality of first workflows generated;

where the new plurality of first workflows have been successfully generated and the new set of first workflows have been successfully selected, passing the new set of first workflows to the physical composition stage within which a new plurality of second workflows is generated based on the new set of first workflows and within which a new set of second workflows is selected from the new plurality of second workflows generated.

16. The method of claim 1, further comprising:

within the logical composition stage, generating the plurality of first workflows based at least on a set of web service types and from which the set of first workflows are selected;

passing the set of first workflows to the physical composition stage;

within the physical composition stage, generating the plurality of second workflows based at least on the set of first workflows and a set of web service instances;

passing the set of second workflows to the runtime stage; and,
within the runtime stage,
  passing the third workflow selected to the execution environment.

17. A method comprising:
within a logical composition stage, selecting a set of first workflows for a web service from a plurality of first workflows generated for the web service, wherein the selecting the set of first workflows includes one of: selecting a first K, first workflows from the plurality of first workflows, and randomly selecting a first workflow, then recursively selecting subsequent first workflows that are maximally distant from previously selected first workflows using a Hamming distance;
within a physical composition stage, selecting a set of second workflows from a plurality of second workflows generated based at least on the set of first workflows selected within the logical composition stage;
within the runtime stage, selecting a third workflow to be executed from the set of second workflows and that satisfies specified requirements;
within an execution environment, executing the third workflow selected, as execution of the web service; and,
periodically, assessing and reselecting the third workflow selected within the runtime stage, the set of second workflows selected within the physical composition stage, and the set of first workflows selected within the logical composition stage, wherein periodically, assessing and reselecting comprises:
within the runtime stage,
  receiving quality of service values regarding the third workflow being executed from the execution environment;
  periodically sending the quality-of-service values and notifications of failures of web service instances of the third workflow being executed to the physical composition stage;
  periodically determining whether the third workflow selected still satisfies the specified requirements;
  where the third workflow selected no longer satisfies the specified requirements,
  selecting a new third workflow from the set of second workflows that satisfies the specified requirements, for execution within the execution environment;
  where the new third workflow that satisfies the specified requirements has been successfully selected,
    passing the third executable workflow to the execution environment for execution therein; and,
  otherwise,
    calling the physical composition stage to select a new set of second workflows from which a new third workflow can be selected within the runtime stage for execution within the execution environment.

18. A computer system comprising:
a memory that stores web service specifications including functional requirements and non-functionality requirements including performance and availability; and
a processor configured to performs that functions of:
  a logical manager that generates a plurality of abstract workflows for a web service, based at least on a set of web service types, and to select a set of abstract workflows for the web service from the plurality of abstract workflows generated, wherein selecting the set of abstract workflows includes one of: selecting a first K abstract workflows from the plurality of abstract workflows, and randomly selecting an abstract workflow, then recursively selecting subsequent abstract workflows that are maximally distant from previously selected abstract workflows using a Hamming distance;
  a physical manager that generates a plurality of executable workflows based at least on the set of abstract workflows and a set of web service instances, and to select a set of executable workflows from the plurality of executable workflows generated; and,
  a runtime manager that selects an executable workflow to be executed, from the set of executable workflows, and that satisfies specified requirements, the executable workflow being executed within an execution environment,
wherein every period $T_M$ the execution environment returns quality-of-service values regarding available web service instances within the execution environment to the runtime manager on which basis the runtime manager is capable of selecting a new executable workflow to be executed within the execution environment,
  periodically sending the quality-of-service values and notifications of failures of web service instances of the executable workflow being executed to the physical composition stage,
  periodically determining whether the executable workflow being executed still satisfies the specified requirements,
  where the executed workflow being executed no longer satisfies the specified requirements,
  selecting a new executable workflow from the set of executable workflows that satisfies the specified requirements, for execution within the execution environment,
  where the new executable workflow that satisfies the specified requirements is successfully selected,
    passing the new executable workflow to the execution environment for execution therein, and
  otherwise,
    calling the physical manage to select a new set of executable workflows from which a new executable workflow to be executed can be selected for execution within the execution environment,
wherein every period $T_R$ the runtime manager returns web service instance feedback to the physical manager on which basis the physical manager is capable of generating a new plurality of executable workflows and selecting a new set of executable workflows therefrom to pass to the runtime manager for selection on the basis thereof of a new executable workflow to be executed within the execution environment,
wherein every period $T_P$ the physical manager returns web service type feedback to the logical manager on which basis the logical manager is capable of generating a new plurality of abstract workflows and selecting a new set of abstract workflows therefrom to pass to the physical manager for generation of a new plurality of executable workflows on the basis thereof and for selection of a new set of executable workflows from the new plurality of executable workflows.

19. A non-transient computer program storage medium, readable by a computer, tangibly embodying a program of instructions executable by said computer to perform a method comprising:
  in a logical composition stage, generating a plurality of abstract workflows for a web service, based at least on a set of web service types, and selecting a set of abstract workflows for the web service from the plurality of abstract workflows generated, wherein selecting the set of abstract workflows includes one of: selecting a first K abstract workflows from the plurality of abstract workflows, and randomly selecting an abstract workflow, then recursively selecting subsequent abstract workflows that are maximally distant from previously selected abstract workflows using a Hamming distance;

in a physical composition stage, generating a plurality of executable workflows based at least on the set of abstract workflows and a set of web service instances, and selecting a set of executable workflows from the plurality of executable workflows generated; and in a runtime stage, selecting an executable workflow to be executed, from the set of executable workflows that satisfies specified requirements, the executable workflow being executed within an execution environment;

wherein every period $T_M$ the execution environment returns quality-of-service values regarding the executable workflow to the runtime stage on which basis a new executable workflow to be executed is selected within the execution environment, periodically sending the quality-of-service values and notifications of failures of web service instances of the executable workflow being executed to the physical composition stage, periodically determining whether the executable workflow being executed still satisfies the specified requirements, where the executed workflow being executed no longer satisfies the specified requirements, selecting a new executable workflow from the set of executable workflows that satisfies the specified requirements, for execution within the execution environment, where the new executable workflow that satisfies the specified requirements is successfully selected, passing the new executable workflow to the execution environment for execution therein, and otherwise, calling the physical manage to select a new set of executable workflows from which a new executable workflow to be executed can be selected for execution within the execution environment, wherein every period $T_R$ the runtime stage returns web service instance feedback to the physical composition stage on which basis a new plurality of executable workflows is generated and a new set of executable workflows is selected therefrom, and wherein every period $T_P$ the physical composition stage returns web service type feedback to the logical composition stage on which basis a new plurality of abstract workflows is generated and a new set of abstract workflows is selected therefrom.

* * * * *